(12) United States Patent
Ndem et al.

(10) Patent No.: US 8,495,576 B2
(45) Date of Patent: Jul. 23, 2013

(54) METHOD FOR ESTIMATING TESTING EFFORTS FOR SOFTWARE UNIT TESTING

(75) Inventors: Guy Collins Ndem, München (DE); Abbas Abdelhamid Abbas Tahir, München (DE)

(73) Assignee: Siemens Aktiengesellschaft, Munich (DE)

( * ) Notice: Subject to any disclaimer, the term of this patent is extended or adjusted under 35 U.S.C. 154(b) by 145 days.

(21) Appl. No.: 13/088,800

(22) Filed: Apr. 18, 2011

(65) Prior Publication Data
US 2011/0258602 A1 Oct. 20, 2011

(30) Foreign Application Priority Data
Apr. 20, 2010 (EP) .................................... 10004186

(51) Int. Cl.
*G06F 17/50* (2006.01)

(52) U.S. Cl.
USPC ............................ 717/124; 717/101; 717/102

(58) Field of Classification Search
None
See application file for complete search history.

(56) References Cited

U.S. PATENT DOCUMENTS

| | | | | |
|---|---|---|---|---|
| 5,729,676 | A | 3/1998 | Inoue | 395/183.14 |
| 7,080,351 | B1 * | 7/2006 | Kirkpatrick et al. | 717/102 |
| 7,350,185 | B2 * | 3/2008 | Sparago et al. | 717/101 |
| 7,823,128 | B2 * | 10/2010 | Bundy et al. | 717/124 |
| 7,971,180 | B2 * | 6/2011 | Kreamer et al. | 717/101 |
| 8,006,223 | B2 * | 8/2011 | Boulineau et al. | 717/101 |
| 8,020,147 | B2 * | 9/2011 | Chaturvedi et al. | 717/120 |
| 8,024,709 | B2 * | 9/2011 | Jadhav et al. | 717/124 |
| 8,036,922 | B2 * | 10/2011 | Yamamoto et al. | 705/7.11 |
| 8,181,159 | B2 * | 5/2012 | Khalil et al. | 717/124 |
| 2005/0229044 | A1 | 10/2005 | Ball | 714/38 |
| 2006/0048114 | A1 * | 3/2006 | Schmidt | 717/148 |
| 2006/0206867 | A1 * | 9/2006 | Parsons et al. | 717/124 |
| 2006/0253739 | A1 * | 11/2006 | Godefroid et al. | 714/38 |
| 2007/0169064 | A1 * | 7/2007 | Hagihara et al. | 717/162 |
| 2008/0092120 | A1 * | 4/2008 | Udupa et al. | 717/124 |
| 2009/0100404 | A1 * | 4/2009 | Chaturvedi et al. | 717/101 |
| 2011/0197176 | A1 * | 8/2011 | Muharsky et al. | 717/113 |
| 2012/0079449 | A1 * | 3/2012 | Sanderson et al. | 717/102 |

OTHER PUBLICATIONS

Tegarden et al., "A Software Complexity Model of Object-Oriented Systems," 1992, University of Colorado, pp. 1-46.*
Hastings et al., "A Vector-Based Approach to Software Size Measurement and Effort Estimation," 2001, IEEE Transactions on software engineering, vol. 27, No. 4, pp. 337-350.*
Mouchawrab et al., "A measurement framework for object-oriented software testability," Software Quality Engineering Laboratory, Carleton University, Nov. 2005, pp. 979-997.*
Cho et al., "Component metrics to measure component quality," Software Engineering Conference, 2001, APSEC 2001, pp. 419-426, Dec. 4-7, 2001.*

(Continued)

*Primary Examiner* — Thuy Dao
*Assistant Examiner* — Stephen Berman
(74) *Attorney, Agent, or Firm* — King & Spalding L.L.P.

(57) ABSTRACT

A method of estimating testing efforts for software unit testing, has at least the steps of assigning each element of a software system present in a development environment a complexity factor, calculating a complexity factor of the software system present in the development environment, and estimating an effort needed for performing testing of a unit under test in the development environment.

17 Claims, 5 Drawing Sheets

OTHER PUBLICATIONS

Tamir et al., "An effort and time based measure of usability", 2008, Proceedings of the 6th international workshop on Software quality, pp. 47-52.*

Silva et al., "Machine Learning Methods and Asymmetric Cost Function to Estimate Execution Effort of Software Testing", Software Testing, Verification and Validation (ICST), 2010 Third International Conference on, Apr. 2010, pp. 275-284.*

Burnett, "A trade-off method between cost and reliability", Computer Science Society, 1997 Proceedings, XVII International Conference of the Chilean, pp. 21-28.*

Masuyama, H., et al., "A New Method of Software Testing by Path Analysis", Systems and Computers in Japan, vol. 17, No. 4, pp. 34-42, Apr. 1, 1986.

* cited by examiner under test, and a method for ed

METHOD FOR ESTIMATING TESTING EFFORTS FOR SOFTWARE UNIT TESTING

CROSS-REFERENCE TO RELATED APPLICATIONS

This application claims priority to EP Patent Application No. 10004186 filed Apr. 20, 2010. The contents of which are incorporated herein by reference in its entirety.

TECHNICAL FIELD

The present invention relates generally to the field of software testing, and more particularly, the present invention relates to a method for estimating the efforts necessary for performing unit testing of software modules.

BACKGROUND

Due to increasing complexity of modern software systems, the likelihood of making errors during a software design phase has increased exponentially. While some of these errors might be detected during testing phase, it is much more cost effective to detect these errors early during design phase. For this reason, formal specification and analysis tools are increasingly being deployed to improve the quality of software design.

Among the various kinds of testing usually performed during the software development cycle, unit testing applies to the individual components of a software system. In principle, unit testing plays an important role in ensuring overall software quality since its role is precisely to detect errors in the component's logic, check all corner cases, and provide complete code coverage. Yet, in practice, unit testing is so hard and expensive to perform that it is rarely done properly. Indeed, in order to be able to execute and test a component in isolation, one needs to write test driver/harness code to simulate the environment of the component. More code is needed to test functional correctness, for instance using assertions checking the component's outputs. Since writing all of this testing code manually is expensive, unit testing is often either performed very poorly or skipped altogether. Moreover, subsequent phases of testing, such as feature, integration and system testing, are meant to test the overall correctness of the entire system viewed as a black-box, not to check the corner cases where bugs causing reliability issues are typically hidden. As a consequence, many software bugs that should have been caught during unit testing remain undetected until field deployment.

Successful software development and implementation requires various levels of software testing. In some instances, software testing involves a developer, tester, or other worker manually analyzing software code and manually generating test cases for each functional aspect of the software to be tested. In other instances, the unit testing is done partially automated partially manually or fully automated by dedicated apparatus testing software.

However, the development of test cases, test code, the running of unit tests, and the interpretation of unit tests is a time consuming process. In many cases, developers do not have the time or the motivation to properly perform all of these unit testing procedures. In some cases, this type of testing is passed on to testers. However, in some cases, testers are not as technically savvy regarding the software language in which the software code is written, and thus, are not always able to properly perform unit testing. Because of these and other challenges and problems to performing basic unit testing, it often goes undone or is performed incompletely or inadequately.

SUMMARY

Further, in cases that involve large or complex pieces of code, such as the industrial software projects, the amount of time and effort involved in testing is usually underestimated. The testing efforts are usually quantified under development efforts but the correct assessment of the involvement in testing activities in difficult to quantify when the development efforts are mapped out. Therefore, according to various embodiments a methodology can be provided that can accurately estimate both the complexity of units under test, and the effort involved in testing the individual test units, with the goal of providing for a more accurate initial estimation of the resources involved in software development.

According to an embodiment, a method of estimating testing efforts for software unit testing, may comprise: assigning each element of a software system present in a development environment a complexity factor; calculating a complexity factor of the software system present in the development environment, and estimating an effort needed for performing testing of a unit under test in the development environment. According to a further embodiment, an atomic unit can be assigned complexity factor 1. According to a further embodiment, calculating the complexity factor of a system may comprise calculating a sum of individual complexities of a plurality of mocked and a plurality of implemented units. According to a further embodiment, the method may further comprise calculating the complexity of the components on which an implemented software component in dependent. According to a further embodiment, estimating an effort needed for performing testing of a unit under test in the development environment may comprise estimating the time needed for developing unit tests for the implemented software components. According to a further embodiment, estimating an effort needed for performing testing of a unit under test in the development environment may comprise estimating the time needed to write unit tests for the implemented software components. According to a further embodiment, estimating an effort needed for performing testing of a unit under test in the development environment may comprise estimating the time needed for preparing the time needed for writing unit tests for the mocked software components. According to a further embodiment, estimating an effort needed for performing testing of a unit under test in the development environment can be estimated via $$T_n = T_{d_n} + (K_c - 1) \times T_{mock}$$

wherein $T_n$ is time needed for developing unit tests for the implemented software components, $T_{d_n}$ is the time needed to write unit tests for the implemented software components, and $T_{mock}$ is the time needed for preparing the time needed for writing unit tests for the mocked software components. According to another embodiment, a computer-readable medium may have recorded thereon a software program to be executed on a computer, the computer readable medium being able to prompt a server in the computer network to perform unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of: assigning each element of a software system present in a development environment a complexity factor; calculating a complexity factor of the software system present in the development environment, and estimating an effort needed for performing testing of a unit under test in the development environment.

BRIEF DESCRIPTION OF THE DRAWINGS

The present invention will be understood more fully from the detailed description given below and from the accompanying drawings of various embodiments, which, however, should not be taken to limit the invention to the specific embodiments, but are for explanation and understanding only.

DETAILED DESCRIPTION

Figure 1:
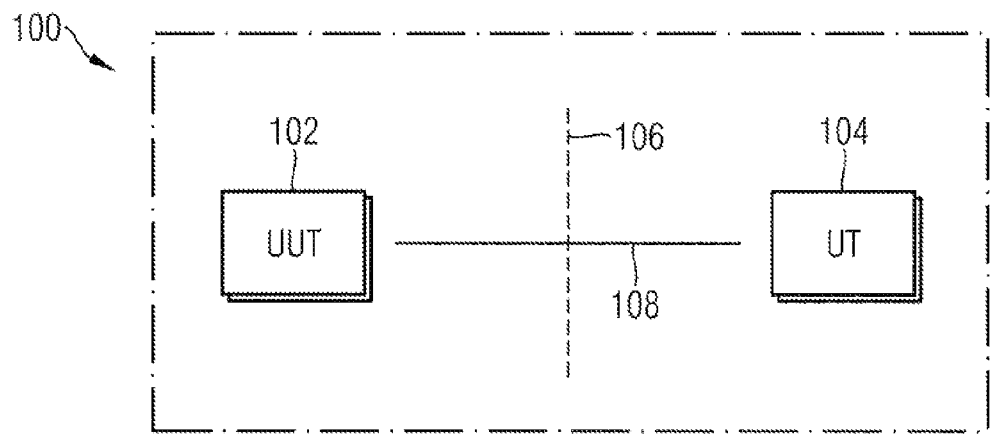
FIG. 1 illustrates an exemplary first environment for conducting unit testing.

According to various embodiments, a method of estimating testing efforts for software unit testing is proposed, comprising at least the steps of assigning each element of a software system present in a development environment a complexity factor, calculating a complexity factor of the software system present in the development environment, and estimating an effort needed for performing testing of a unit under test in the development environment.

The method of estimating testing efforts for software unit testing assumes that an atomic unit is assigned complexity factor 1. In accordance with the method of estimating testing efforts for software unit testing calculating the complexity factor of a system comprises calculating a sum of individual complexities of a plurality of mocked and a plurality of implemented units.

According to various embodiments, the method estimating testing efforts for software unit testing further comprises calculating the complexity of the components on which an implemented software component in dependent.

According to various embodiments, in the method of estimating testing efforts for software unit testing, estimating an effort needed for performing testing of a unit under test in the development environment comprises estimating the time needed for developing unit tests for the implemented software components. Estimating an effort needed for performing testing of a unit under test in the development environment also comprises estimating the time needed to write unit tests for the implemented software components. Estimating an effort needed for performing testing of a unit under test in the development environment comprises further comprises estimating the time needed for preparing the time needed for writing unit tests for the mocked software components.

According to various embodiments, estimating an effort needed for performing testing of a unit under test in the development environment is estimated via $$T_n = T_{d_n} + (K_c - 1) \times T_{mock}$$

wherein $T_n$ is time needed for developing unit tests for the implemented software components, $T_{d_n}$ is the time needed to write unit tests for the implemented software components, and $T_{mock}$ is the time needed for preparing the time needed for writing unit tests for the mocked software components.

The various embodiments propose that the estimation of the effort expended for testing individual test units may be performed manually or in an automated fashion, via a computer. Should the estimation be performed automatically, the various embodiments also propose a computer-readable medium having recorded thereon a software program to be executed on a computer, the computer readable medium being able to prompt a server in the computer network to perform unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of assigning each element of a software system present in a development environment a complexity factor, calculating a complexity factor of the software system present in the development environment, and estimating an effort needed for performing testing of a unit under test in the development environment.

These and other objects, features, and advantages will be apparent through the detailed description of the embodiments and the drawings attached hereto. It is also to be understood that both the foregoing summary and the following detailed description are exemplary and not restrictive of the scope of the invention.

The shortcomings of the prior art are overcome and additional advantages are provided through the provision of a method, a system, and computer program product for generating unit test scripts.

By software testing is understood in general any activity aimed at determining that a software system meets its required results and is considered as an integral part of the software development process. The goals of testing are different than those of all the other activities associated with the software development process. The software development activities, other than testing, aim at building a software product in accordance with requirements specified initially. Testing activities, on the other hand, aim to investigate the degree to which the software meets its requirements.

Testing is an activity that may be done at different levels. Unit testing is considered to be the lowest testing level. A unit test examines a unit code in isolation from the system in order to ensure that it meets its requirements. The size of "an unit" depends on the size of a set of coherent functionality and in practice may be determined by the method, class or testing package.

Unit testing is performed either by the software developers themselves or by separate software testers.

Developers are expected to test the units of code they develop as they progress with implementing them. Most times, the efforts involved with unit test development may exceed the efforts needed for developing the unit of code itself. In many large scale, industrial software projects, the unit test efforts are usually estimated as included in the development efforts, but usually underestimated. One of the reasons is the absence of a systemic technique for efforts estimation at unit test level.

The various embodiments as discussed above aim to provide solution to the above summarized problems embodying a method for calculating the complexity of units under test and propose a unitary modality of estimation for individual test units.

Unit testing is an integral part of ensuring product quality. It offers the first chance for developers to uncover defects in the source code they are developing. When performed effectively, unit testing provides significant gains in software product quality and results in the reduction of software development time and associated costs. Ideally, units testing should be performed by the person who developed the software unit code. Alternatively, unit testing is conducted by dedicated testers, who increase the cost of software development since they are usually an external resource.

A unit of software code can be an atomic source of code, that is to say that the unit has no dependencies to other code units or it may be a unit with dependencies on other units.

Referring now to FIG. 1, FIG. 1 illustrates an exemplary first environment for conducting unit testing.

In the exemplary development environment 100 illustrated in FIG. 1 a unit under test (UUT) 102 is present. Said UUT 102 is independent of any other software component or code unit 104 that may also be present in the development environment 100. No positional relationships 106 or functional relationships 108 are present between the UUT 102 and the other elements present in the development environment 100. Such UUT 102 are called atomic units.

Figure 2:
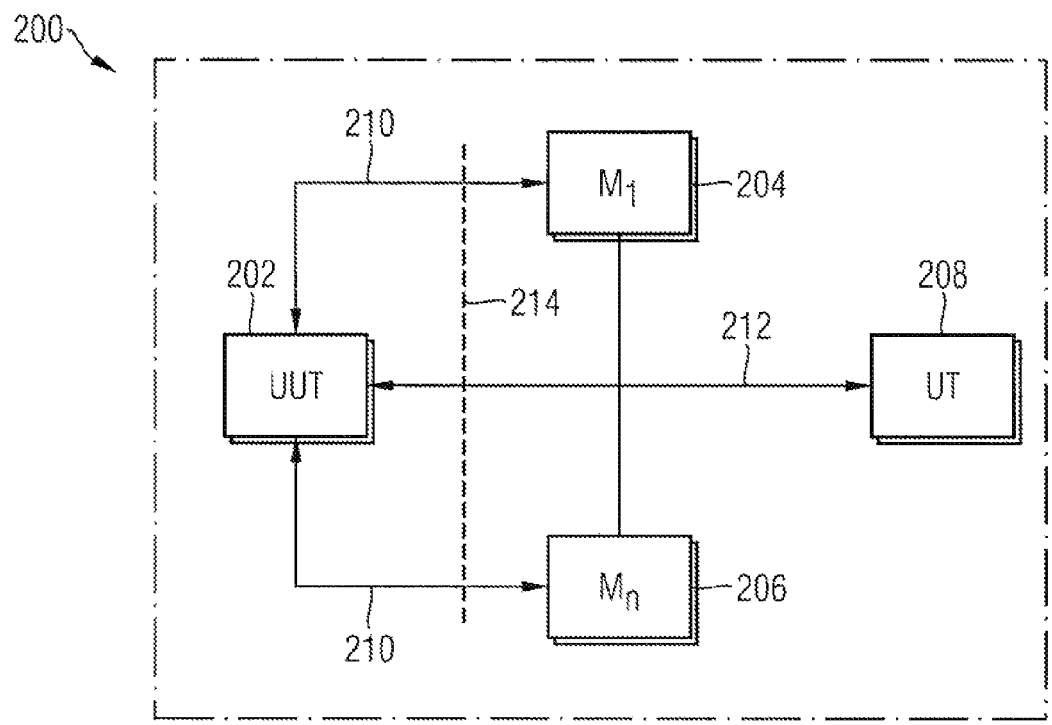
FIG. 2 illustrates an exemplary second environment for conducting unit testing.

Referring now FIG. 2, FIG. 2 illustrates an exemplary second environment for conducting unit testing.

In the exemplary development environment 200 illustrated in FIG. 2, a UUT 202 is present in conjunction with other software components and code units 208 that are not under test. Further, mocked components 204, 206 are as well present in development environment 200. Positional relationships 214 and/or functional relationships 210, 212 are present between the UUT 202 and the other elements present in the development environment 200, the mocked components 204, 206 and the other code units 208.

Components of software not yet implemented are replaced in the development environment by mocked components. Advantageously, the use of mocked components permits the insulation of the units under test should an error be present. Said error will not propagate from the other elements to the unit under test.

Figure 3:
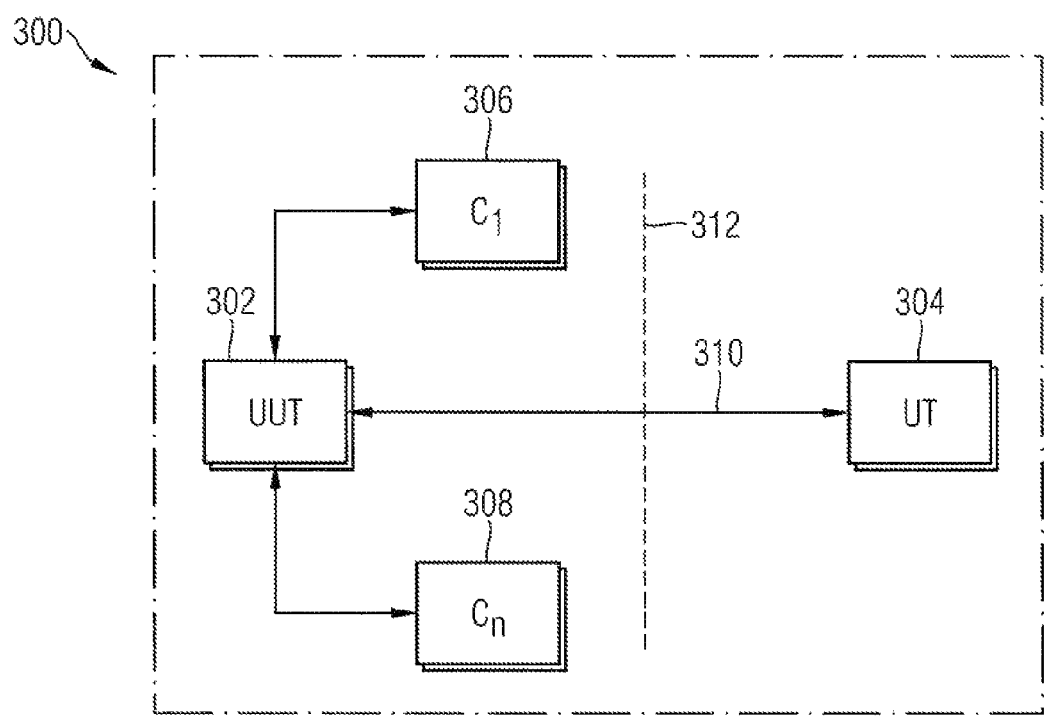
FIG. 3 illustrates an exemplary third environment for conducting unit testing.

Referring now FIG. 3, FIG. 3 illustrates an exemplary third environment for conducting unit testing.

As illustrated, the development environment 300 has in addition to the elements of development environment 200 other software components 306, and 308 that have been already implemented. Positional and functional relationships 310, 312 are present between the elements of development environment 300.

Figure 4:
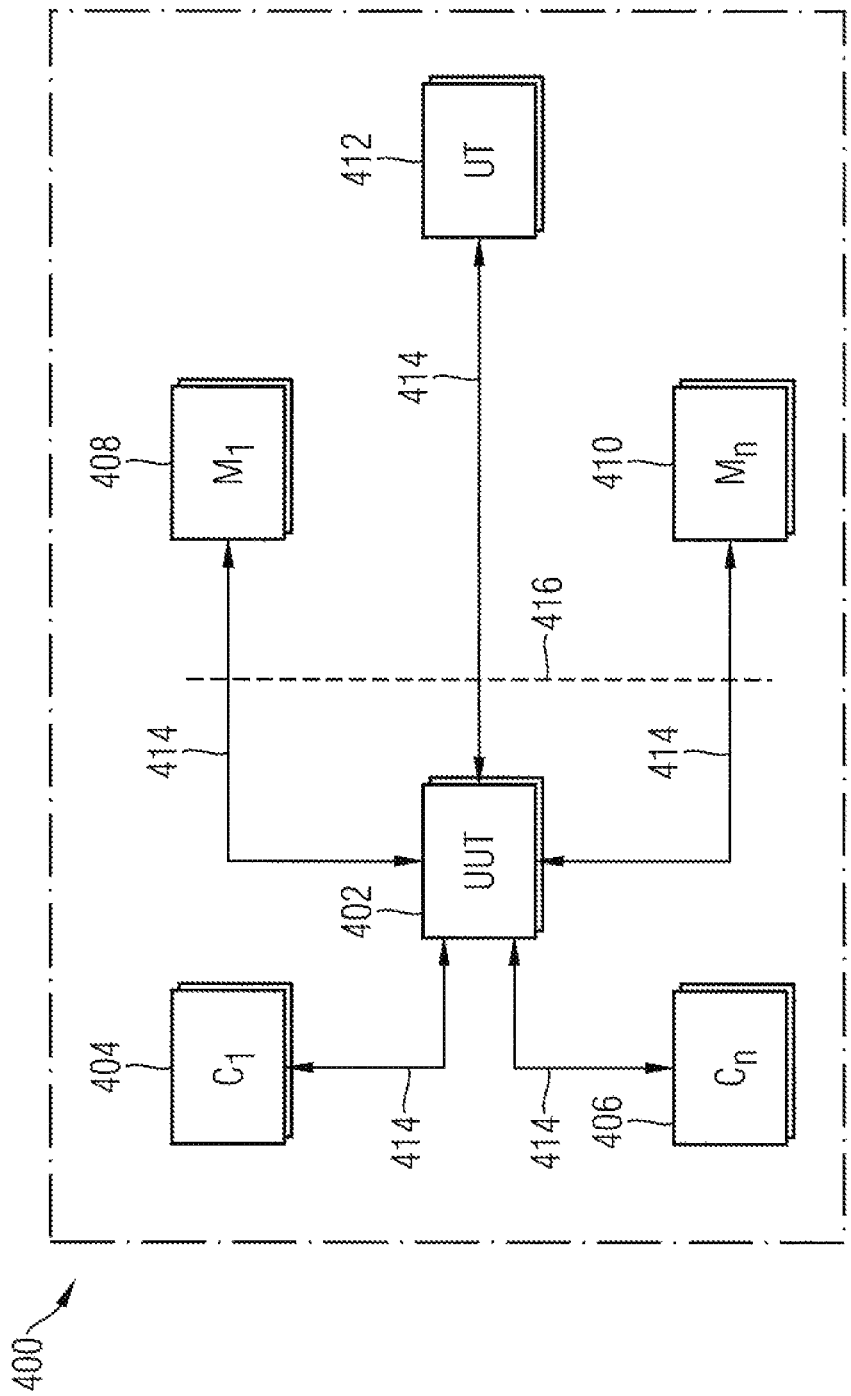
FIG. 4 illustrates an exemplary fourth environment for conducting unit testing.

Referring now FIG. 4, FIG. 4 illustrates an exemplary forth environment for conducting unit testing.

As illustrated in FIG. 4 the development environment 400 comprises a unit under test 402, other software components 404, 406, mocked units 408, 410 to replace the software components not yet implemented and other units of code 412 that are not under test. Positional and functional relationships 414, 416 are present between the elements of the development environment 400.

It has been noted that the testing efforts depend on the complexity of the structure to be tested.

In accordance with a first embodiment, it is proposed a method to calculate a complexity indicator of the units under test. The calculated complexity indicator is further used in accordance with further embodiments as a weighing factor for effort estimation for individual test units.

It is assumed that to each atomic unit present in the exemplary development environments 100, 200, 300, and 400, a complexity factor equal to 1 is assigned. All the other components units are assigned a complexity factor equal to $1+K_c$, where by $K_c$ is denoted the calculated complexity of the component.

Figure 5:
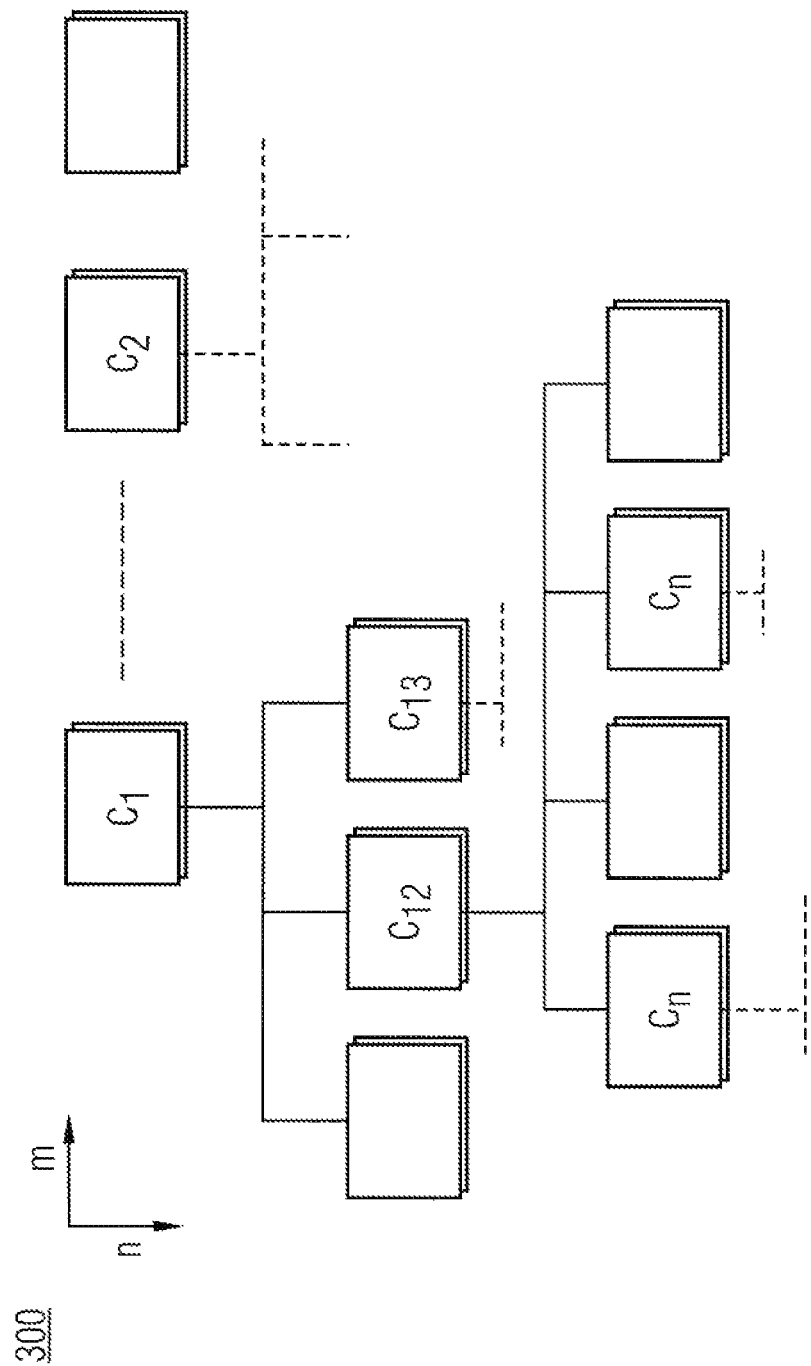
FIG. 5 illustrates a development environment that comprises an alleatoritly selected configuration of elements.

FIG. 5 illustrates a development environment that comprises an alleatoritly selected configuration of elements. As noted development environment 500 comprises both atomic elements and implemented software elements and mocked software elements.

The complexity factor of the system may be estimated by $$K_{system} = \sum_1^m K_m$$

wherein by $K_{system}$ is denoted the complexity of the entire system,
$K_m$ is the complexity of the component $C_m$
m represents the number of top level system components (e.g. $C_1, C_2, \ldots C_n$ as in FIG. 5)

The calculated complexity of the unit component is estimated by $$K_{cn} = 1 + \sum_1^m K_{nm}$$

wherein by $K_{cn}$ is denoted the complexity of each unit component (here $C_n$);
by $K_{nm}$ is denoted the complexity of the components on which component $C_n$ is dependent, via vertical dependencies (e.g. $K_{12}$ is the complexity of component $C_{12}$).

The time, alias effort, needed for developing unit tests for $C_n$ can be estimated by the various embodiments via $$T_n = Td_n + (K_c - 1) \times T_{mock}$$

where
by $T_n$ is denoted the time or effort needed for developing unit tests for $C_n$,
$Td_n$ is the time needed to write unit test for $C_n$, and
$T_{mock}$ is the time needed for preparing mock components.

Figure 6:
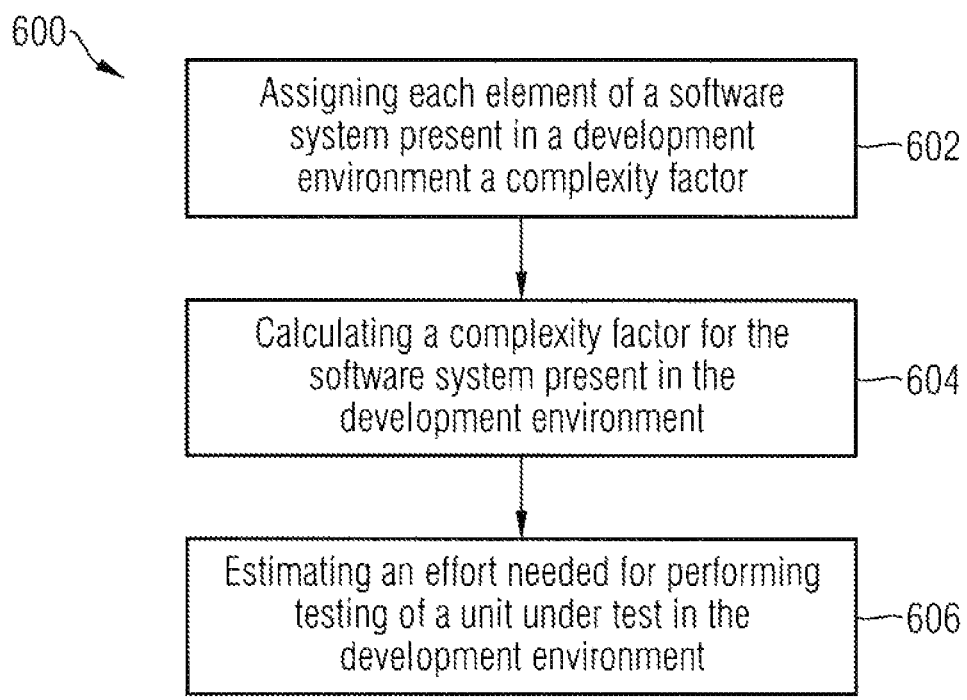
FIG. 6 illustrates a flow chart representative for the method.

Referring now to FIG. 6, FIG. 6 illustrates a flow chart representing the method according to various embodiments.

In accordance with various embodiments, the method of estimating testing efforts for software unit testing 600 may comprise at least the steps of assigning (602) each element of a software system present in a development environment a complexity factor, calculating (604) a complexity factor of the software system present in the development environment, and estimating (606) an effort needed for performing testing of a unit under test in the development environment.

The method of estimating testing efforts for software unit testing assumes that an atomic unit is assigned complexity factor 1. In accordance with the method of estimating testing efforts for software unit testing 600 calculating (604) the complexity factor of a system comprises calculating a sum of individual complexities of a plurality of mocked and a plurality of implemented units.

According to various embodiments, the method 600 of estimating testing efforts for software unit testing may further comprise calculating the complexity of the components on which an implemented software component in dependent.

In accordance with further aspects of various embodiments in the method 600 of estimating testing efforts for software unit testing, estimating 606 an effort needed for performing testing of a unit under test in the development environment comprises estimating the time needed for developing unit tests for the implemented software components. Estimating 606 an effort needed for performing testing of a unit under test in the development environment also comprises estimating the time needed to write unit tests for the implemented software components. Estimating 606 an effort needed for performing testing of a unit under test in the development environment comprises further comprises estimating the time needed for preparing the time needed for writing unit tests for the mocked software components.

According to various embodiments, estimating 606 an effort needed for performing testing of a unit under test in the development environment is estimated via $$T_n = T_{d_n} + (K_c - 1) \times T_{mock}$$

wherein $T_n$ is time needed for developing unit tests for the implemented software components, $T_{d_n}$ is the time needed to write unit tests for the implemented software components, and $T_{mock}$ is the time needed for preparing the time needed for writing unit tests for the mocked software components.

The various embodiments propose that the estimation of the effort expended for testing individual test units may be performed manually or in an automated fashion, via a computer. Should the estimation be performed automatically, the various embodiments also propose a computer-readable medium having recorded thereon a software program to be executed on a computer, the computer readable medium being able to prompt a server in the computer network to perform unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of assigning each element of a software system present in a development environment a complexity factor, calculating a complexity factor of the software system present in the development environment, and estimating an effort needed for performing testing of a unit under test in the development environment.

Those having skill in the art will appreciate that the invention described herein may work with various configurations. Accordingly, more or less of the aforementioned system components may be used and/or combined in various embodiments. Additionally, more or less of the aforementioned operations may be performed and/or various operation may be performed in varying order. It should also be understood that the various software modules discussed herein and unit testing application that are utilized to accomplish the functionalities described herein may be maintained and or executed on one or more special purpose or general purpose computers and/or processors cable of responding to and executing instructions in a defined manner as necessary. In some embodiments, as would be appreciated, the functionalities described herein may be implemented in various combinations of hardware and/or firmware, in addition to, or instead of, software.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method executed by a processor for estimating testing efforts for software unit testing, comprising:
   assigning each element of a software system present in a development environment a complexity factor;
   calculating a complexity factor of the software system present in the development environment; and
   estimating an effort needed for performing testing of a unit under test in the development environment based at least in part on the equation:

$$T_n = T_{d_n} + (K_c - 1) \times T_{mock}$$

wherein $T_n$ is a duration of time needed for developing unit tests for one or more implemented software components;
   $T_{d_n}$ is a duration of time needed to write unit tests for the one or more implemented software components;
   $K_c$ is a calculated complexity of the one or more implemented software components; and
   $T_{mock}$ is a duration of time needed for preparing a duration of time needed for writing unit tests for one or more mocked software components.

2. The method according to claim ,1 wherein an atomic unit is assigned complexity factor 1.

3. The method according to claim 1, wherein calculating the complexity factor of a system comprises calculating a sum of individual complexities of a plurality of mocked and a plurality of implemented units.

4. The method according to claim 1, wherein the method further comprises calculating the complexity of one or more components on which an implemented software component is dependent.

5. The method according to claim 1, wherein estimating an effort needed for performing testing of a unit under test in the development environment comprises estimating a duration of time needed for developing unit tests for one or more implemented software components.

6. The method according to claim 1, wherein estimating an effort needed for performing testing of a unit under test in the development environment comprises estimating a duration of time needed to write unit tests for one or more implemented software components.

7. The method according to claim 1, wherein estimating an effort needed for performing testing of a unit under test in the development environment comprises estimating a duration of time needed for preparing a duration of time needed for writing unit tests for one or more mocked software components.

8. A computer program product comprising a computer-readable non-transitory medium storing a software program to be executed on a computer, the computer readable non-transitory medium being able to prompt a server in the computer network to perform unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of:
assigning each element of a software system present in a development environment a complexity factor;
calculating a complexity factor of the software system present in the development environment; and
estimating an effort needed for performing testing of a unit under test in the development environment based at least in part on the equation:

$$T_n = T_{d_n} + (K_c - 1) \times T_{mock}$$

wherein $T_n$ is a duration of time needed for developing unit tests for one or more implemented software components;

$T_d$ is a duration of the time needed to write unit tests for the one or more implemented software components;

$K_c$ is a calculated complexity of the one or more implemented software components; and $T_{mock}$ is a duration of time needed for preparing a duration of time needed for writing unit tests for one or more mocked software components.

9. The computer program product according to claim 8, wherein an atomic unit is assigned complexity factor 1.

10. The computer program product according to claim 8, wherein calculating the complexity factor of a system comprises calculating a sum of individual complexities of a plurality of mocked and a plurality of implemented units.

11. The computer program product according to claim 8, further comprising calculating the complexity of one or more components on which an implemented software component is dependent.

12. The computer program product according to claim 8, wherein estimating an effort needed for performing testing of a unit under test in the development environment comprises estimating a duration of time needed for developing unit tests for one or more implemented software components.

13. The computer program product according to claim 8, wherein estimating an effort needed for performing testing of a unit under test in the development environment comprises estimating a duration of time needed to write unit tests for one or more implemented software components.

14. The computer program product according to claim 8, wherein estimating an effort needed for performing testing of a unit under test in the development environment comprises estimating a duration of time needed for preparing a duration of time needed for writing unit tests for one or more mocked software components.

15. A method, executed by a processor, of estimating testing efforts for software unit testing, comprising:
assigning each element of a software system present in a development environment a complexity factor;
calculating a complexity factor of the software system present in the development environment by calculating a sum of individual complexities of a plurality of mocked and a plurality of implemented units;
estimating an effort needed for performing testing of a unit under test in the development environment based at least in part on the equation:

$$T_n = T_{d_n} + (K_c - 1) \times T_{mock}$$

wherein $T_n$ is a duration of time needed for developing unit tests for one or more implemented software components, $T_{dn}$ is a duration of time needed to write unit tests for the one or more implemented software components, $K_c$ is a calculated complexity of the one or more implemented software components, and $T_{mock}$ is a duration of time needed for preparing a duration of time needed for writing unit tests for one or more mocked software components; and calculating the complexity of the components on which an implemented software component is dependent.

16. The method according to claim 15, wherein estimating an effort needed for performing testing of a unit under test in the development environment comprises estimating the time needed for developing or to write unit tests for the implemented software components.

17. The method according to claim 15, wherein estimating an effort needed for performing testing of a unit under test in the development environment comprises estimating the time needed for preparing the time needed for writing unit tests for one or more mocked software components.

\* \* \* \* \*